March 3, 1931.                    H. WEICHSEL                    1,795,063
                            ALTERNATING CURRENT MOTOR
                              Filed May 7, 1930
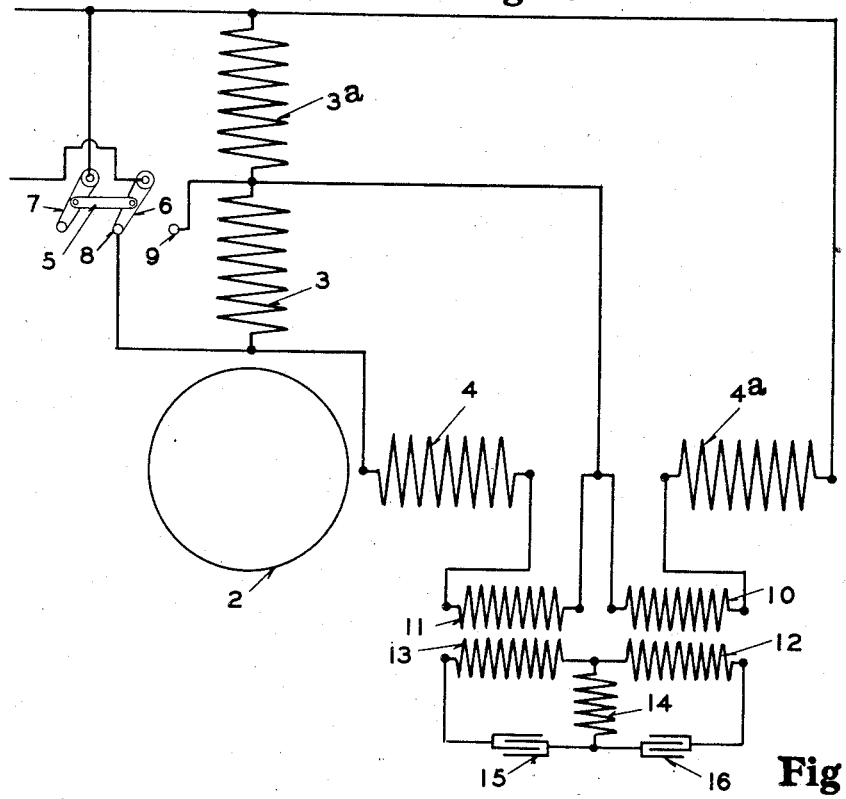
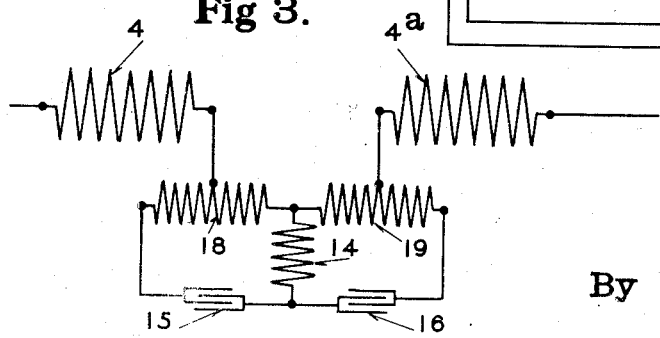
Inventor
HANS WEICHSEL
By E. E. Huffman
    Att'y.

Patented Mar. 3, 1931

1,795,063

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

ALTERNATING-CURRENT MOTOR

Application filed May 7, 1930. Serial No. 450,381.

In a condenser motor whose speed is adjustable by regrouping the windings to change the number of poles, it is desirable that the "apparent" energy of the phase displacing condenser be different in N-pole operation from that in 2N-pole operation, in order that the energy consumed in the phase displacing circuit have, in both instances, the most desirable relation to the energy taken by the main inducing winding. It is the object of my invention to provide means whereby the "apparent" condenser energy is automatically changed, when the number of poles is changed, without reorganizing any connections in the condenser circuit.

In the accompanying drawings Figure 1 diagrammatically indicates my improved motor; Figure 2 illustrates the transformer employed; and Figure 3 diagrammatically indicates a modification of the transformer of Figure 2 to one of the autotransformer type.

Referring to Figure 1, 2 diagrammatically indicates the rotor of the machine, the stator of which is provided with a main inducing winding comprising the groups 3 and 3a and an auxiliary inducing winding displaced 90 electrical degrees from the main winding and comprising the groups 4 and 4a. The inducing windings are so distributed over the stator member that when groups 3 and 3a are connected in parallel, and groups 4 and 4a in parallel, an N-pole stator magnetization is produced which may be of 2, 4 or more poles, and when these winding groups are connected in series the stator produces a 2N-pole magnetization.

As will be apparent from Figure 1 showing the winding connections, a single two-blade switch 5 establishes connections whereby the groups of each inducing winding are connected in series with each other when the switch is in the position shown in the figure, and connects these groups in parallel when blade 6 is placed on contact 9 and blade 7 on contact 8. In each position of the switch the main and auxiliary windings, as a whole, are connected to the line in parallel.

For the purpose of my invention a special transformer is provided which has two primary coils 10 and 11 so connected in the stator circuits that under the 2N-pole connection of the inducing windings these primary coils are in series with each other and with the groups 4 and 4a of the auxiliary inducing winding. Under the N-pole connections of the stator windings the primary 10 is in series with winding group 4a and primary 11 in series with winding group 4 with respect to circuits by which these winding groups are connected to the line.

The transformer is provided with three secondary windings 12, 13 and 14, in circuit with which, in the manner most clearly shown in Figure 1, are condensers 15 and 16.

The relation and interaction of the transformer windings is illustrated in Figure 2 wherein a three-leg transformer 17 is diagrammatically indicated. The primary windings 10 and 11 are on the outer legs of the transformer. The secondary windings 12 and 13 are also on the outer legs of the transformer but winding 14 is on the central leg and is connected in series, not only with secondary winding 13 and condenser 15, but also with secondary winding 12 and condenser 16.

As one possible connection of the transformer windings for the purpose of my invention, the primary windings 10 and 11 may be so connected in their circuits that when the stator windings of groups 4 and 4a are connected in series, they produce fluxes of the same direction whereby no flux will pass through the central leg of the transformer and, therefore, no voltage be produced in the secondary winding 14. When the stator windings are given their parallel grouping (N-pole connection) the current direction through winding 11 is reversed and the primary windings then magnetize in opposite directions, whereby each sets up a flux which passes through the central leg of the transformer and thereby induces a voltage in the winding 14, which voltage combines with the voltages of the secondary windings 12 and 13 to change the voltages across the terminals of the condensers 15 and 16. Thus the "apparent" energy draw of the condensers may be automatically increased or decreased, depending upon whether winding 14 is so connected to the other secondary windings as to oppose or add to their voltages. Other continuations or connections of the transformer windings shown are, of course, possible to secure the described result of automatically changing the effective value of the capacity when the number of poles is changed.

As illustrated in Figure 3, the transformer may be of the "auto" type, the windings 11 and 13 being combined into a single winding 18 and windings 10 and 12 into a single winding 19.

Having fully described my invention, what I claim as new and desire to secure by Letters Patent of the United States is:

1. In a split-phase motor, a main inducing winding and an auxiliary inducing winding displaced therefrom, means for so grouping the turns of said windings as to produce either an N-pole or a 2N-pole magnetization, a transformer having two primary windings so connected in the auxiliary circuits that the relative direction of the current through said windings changes when the number of stator poles is changed, a condenser in the secondary circuit of the transformer, and means governed by the relative direction of current in the primary windings for varying the voltage impressed on the condenser.

2. In a split-phase motor, a main inducing winding and an auxiliary inducing winding displaced therefrom, means for so grouping the turns of said windings as to produce either an N-pole or a 2N-pole magnetization, a transformer having two primary windings and three secondary windings, said primary windings being so connected in the auxiliary winding circuits that the relative direction of the current through said windings changes when the number of stator poles is changed.

3. In a split-phase motor, a main inducing winding and an auxiliary inducing winding displaced therefrom, means for so grouping the said windings as to produce either an N-pole or a 2N-pole magnetization, a three-leg transformer having two primary windings, one on each outer leg, and three secondary windings, one on each outer leg, and the third on the central leg, said primary windings being so connected in the auxiliary winding circuits that the relative direction of the current through said windings changes when the number of stator poles is changed, and two condensers, one being connected in series with the central secondary winding and one of the outer secondary windings, and the other condenser being connected in series with the central secondary winding and with the other outer secondary winding.

In testimony whereof, I hereunto affix my signature, this 22d day of April, 1930.

HANS WEICHSEL.